United States Patent
Hess

(10) Patent No.: US 7,789,937 B2
(45) Date of Patent: Sep. 7, 2010

(54) SYSTEM AND METHOD FOR RECOVERING ICE-CLAD MACHINERY AND EQUIPMENT

(76) Inventor: Spencer W. Hess, 1961 Newark Ave., Whiting, NJ (US)

( * ) Notice: Subject to any disclaimer, the term of this patent is extended or adjusted under 35 U.S.C. 154(b) by 158 days.

(21) Appl. No.: 11/903,694

(22) Filed: Sep. 25, 2007

(65) Prior Publication Data
US 2009/0078114 A1    Mar. 26, 2009

(51) Int. Cl.
*B01D 53/02* (2006.01)
(52) U.S. Cl. .............. 95/1; 95/4; 95/10; 95/17; 95/18; 95/21; 96/112; 23/294 R; 62/54.2; 430/124.12; 585/801; 239/60
(58) Field of Classification Search ............ 95/1, 95/4, 10, 17, 18, 21; 96/112; 23/294 R; 62/54.2; 430/124.12; 585/801; 239/60
See application file for complete search history.

(56) References Cited

U.S. PATENT DOCUMENTS

| 2,389,452 | A | * | 11/1945 | Patterson ............... 34/76 |
| 2,508,107 | A | * | 5/1950 | Flosdorf et al. .......... 426/385 |
| 3,085,012 | A | * | 4/1963 | Wayne ................. 34/287 |
| 3,453,741 | A | * | 7/1969 | Clark et al. ............ 34/290 |
| 4,222,244 | A | * | 9/1980 | Meckler .............. 62/235.1 |
| 6,155,060 | A | * | 12/2000 | Parkman ............... 62/94 |
| 6,652,628 | B1 | * | 11/2003 | Hess ................. 95/113 |
| 7,305,845 | B2 | * | 12/2007 | Mangano et al. .......... 62/276 |

* cited by examiner

Primary Examiner—Robert J Hill, Jr.
Assistant Examiner—Christopher P Jones
(74) Attorney, Agent, or Firm—Charles I. Brodsky

(57) ABSTRACT

Ice-clad machinery and equipment in very cold environments are made more easily recoverable by enclosing the machinery and equipment in an environmentally contained area and introducing desiccant dehumidified air into the contained area to lower the vapor pressure in fostering a "sublimation" process conversion from the solid state of the ice to a gaseous state which can be exhausted without first going through any intermediate liquid state.

16 Claims, 2 Drawing Sheets

SYSTEM AND METHOD FOR RECOVERING ICE-CLAD MACHINERY AND EQUIPMENT

CROSS-REFERENCE TO RELATED APPLICATIONS

None.

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable

BACKGROUND OF THE INVENTION

1. Field of the Invention

This invention relates to a system and method for recovering ice-clad machinery and equipment, in general, and to a system and associated method for recovering machinery and equipment frozen by the extinguishment of fires in very cold climates, in particular.

2. Description of the Related Art

As will be understood, insurance costs associated with water damage to machinery and equipment in extinguishing fires at commercial and industrial sites in very cold climates are frequently many times that faced in milder climates. Where a fire occurs at sub-zero temperatures, for example, the water used to extinguish the fire could freeze the machinery and equipment with ice from several inches thick to several feet thick. One proposal of recovering and reclaiming the machinery and equipment by heating and melting the ice is frowned upon because the ice would contain all kinds of hydrocarbons which, upon release, would cause environmental problems of their own. The accepted ways of proceeding then are: a) the very labor-intensive chipping away of the ice at these sub-zero temperatures; or b) waiting until springtime for the ice to begin to melt and then chipping it away. Only when the ice is gone, can control boxes and valves be opened, inspections made, and machinery tested to determine the extent of any damage done. With either alternative, the business interruption insurance costs are quite high.

As will be appreciated, this can be a very serious problem in the various oil fields of Canada and other Northern countries. Besides the enormous cost to the insurance company, even with business interruption insurance, the cost to an oil company's business could be immeasurably high.

SUMMARY OF THE INVENTION

As will become clear from the following description, the method of the invention employs the physics phase transition of "Sublimation" to convert the solid ice to a gas without going through any intermediate liquid state. As will be seen, desiccant dehumidification, heat supplementation, and high energy particulate air (HEPA) filtration are utilized in converting the ice to its gaseous state. A HAZMAT crew is then able to easily clean up whatever hydrocarbons and contaminants drop to the ground, cutting the recovery time between 33⅓ and 50%. As will also become clear, the ice-clad machinery and equipment are first environmentally contained in a shrink-wrap tent or like enclosure, and the conversion equipment is installed in an insulated container. Temperature and humidity are critically controlled in the containment area to optimize the "sublimation" process.

DETAILED DESCRIPTION OF THE INVENTION

Figure 1:
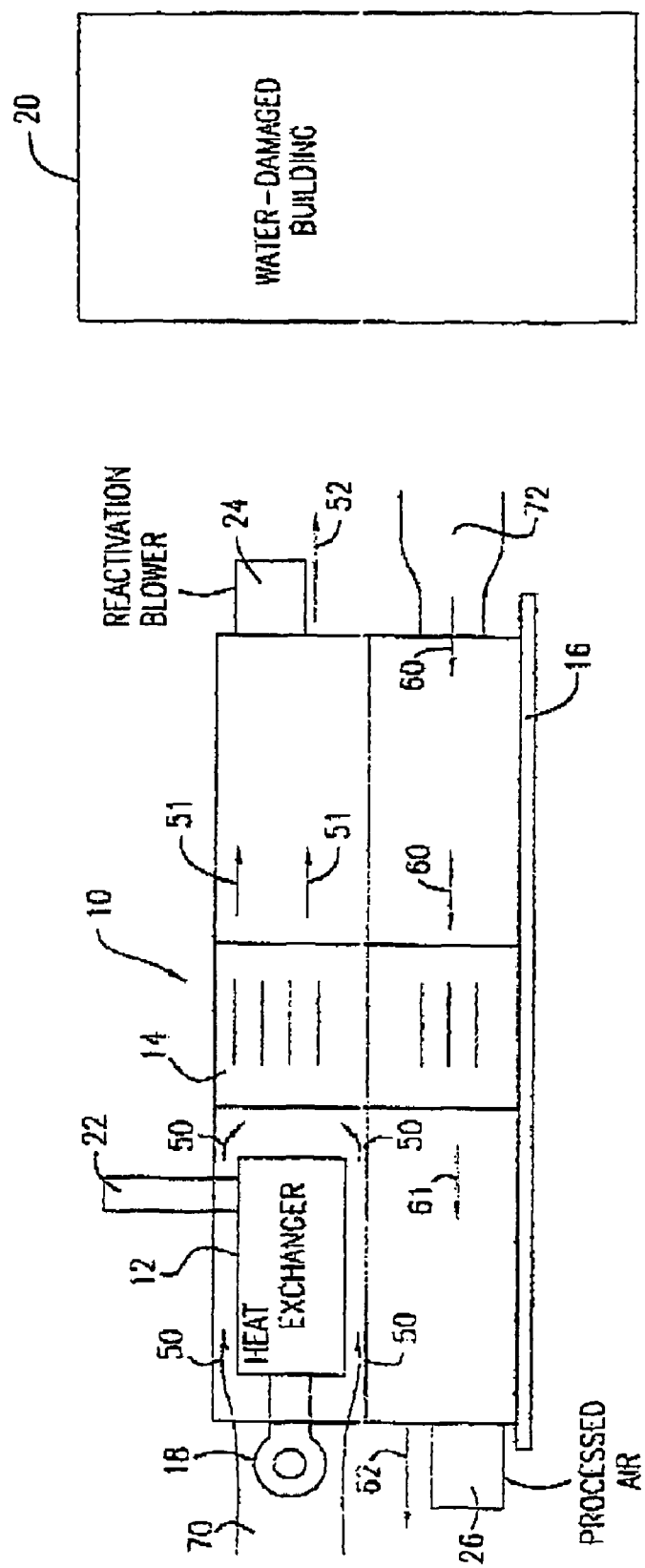
FIGS. 1-3 are helpful in an understanding of the use of my U.S. Pat. No. 6,652,628 invention to meet the needs of recovering this frozen machinery and equipment.

As described in my U.S. Pat. No. 6,652,628, mobile desiccant dehumidifiers have begun to be employed more and more in recent years to dry water damaged buildings to reduce health problems caused by the incipient mold which develops. As is there noted, silica gel is oftentimes employed as the desiccant in a wheel through which the moistened air is pulled from the walls, the floor, the concrete, etc. into the dehumidifying chamber. As the silica gel absorbs the moisture, it becomes necessary to additionally heat the desiccant to liberate the moisture collected. Where large scale desiccant equipment is employed, the heat energy required is typically provided by electric heating or propane heating.

My patent recognized the need to rapidly dehumidify water-logged buildings and their contents by recirculating air between the building involved and the equipment employed—with the air being ducted from the building through the equipment (which absorbed moisture from the air to lower its humidity), and with the dried air being routed back into the building where it absorbed additional moisture from the surrounding air in the building and the building contents. Recognizing that the recirculation process needed to be carried on continuously, 24 hours a day, until the building interior was determined to be sufficiently dry, such drying process needed to continue for a number of days—especially where a structure such as a hotel or office building had been damaged by water due to a storm or the extinguishment of a fire. However, in order for the desiccant to keep absorbing water, my patent further recognized that the desiccant must be continuously heated to evaporate the water that it had absorbed. Thus, the equipment employed required an energy source or sources to (i) drive a processed air blower to recirculate air to and from the drying equipment and the building, (ii) drive a reactivation blower to direct heated ambient air through the desiccant and (iii) heat the ambient air prior to its passing through the desiccant. For a hotel, office building, or other typical commercial building, relatively large amounts of energy continued to be required to heat the ambient air so as to keep the desiccant sufficiently dry.

As described in my issued patent, on the other hand, such firing of the heat exchanger to heat the air for evaporating moisture from the desiccant forswore the use of electric heaters or propane burners as previously employed, and proceeded instead by the burning of diesel fuel—or its equivalent of, kerosene or No. 1 or No. 2 fuel oil. As there set out, the diesel fuel employed in the heating process was available virtually anywhere diesel trucks served as a means of transportation. Because diesel fuel provided a greater amount of BTU's per gallon than propane, less fuel was required to provide the heat for the desiccant than with propane, resulting in a cost savings in use.

Also, because such fuel burned without producing moisture, the processed air became that much drier, enabling the reactivation of the desiccant to be accomplished faster, thereby increasing performance in operation. And, because the desiccant dehumidifier of that invention operated more efficiently, its construction allowed for a reduction in the required horsepower of the reactivation blower pulling the ambient air over the heat exchanger—resulting in a more compact machine, for easier transportation.

In accordance with the present invention, such desiccant dehumidifier and its manner of operation form the basis for a sublimation phase transition to convert ice around frozen machinery and equipment to a gas phase with substantially no intermediate liquid state. However, as the desiccant dehumidifier of my U.S. Pat. No. 6,652,628 raised the ambient outside temperature only some 30° F. or so, additional heat is needed in the sub-zero climates of negative 15°-25° F. to bring the temperature closer to a positive 25°-28° F. at which the system of the present invention preferably operates. Recovering and reclaiming the machinery and equipment then follows much faster and easier than at the lower temperatures.

In accordance with one system arrangement of the invention, the ice-clad machinery and equipment is first enclosed with such diesel fuel driven desiccant dehumidifier in an environmentally contained area—such as within a shrink-wrap tent. The desiccant dehumidified air then creates an extremely low vapor pressure within the tent, facilitating the transition from the ice state to the gaseous state. The wet vapor gas is then exhausted via a fan outside the tent-like containment. Substantially, the only manpower required is that to monitor the electric motors and generators of the desiccant dehumidifier and the temperature and relative humidity in the contained area of the operation to ensure that the desiccant dehumidification is proceeding properly. While this might require the presence of redundant and back-up systems in the event of a component going down, the cost savings as contrasted with the expense of business interruption insurance would continue to be quite dramatic.

As will be appreciated, however, the desiccant dehumidifier just cannot be brought into the environmentally contained area of the frozen machinery and equipment, turned on, and work immediately. At temperatures of 15°, 20° and 25° F. below zero, no desiccant dehumidifier could be expected to operate at once. Therefore, according to the invention, the desiccant dehumidifier is first installed in its own insulated container—like a cargo shipping container—with its own kerosene-type heaters, to "soak" the desiccant dehumidifier in heat for several days or longer in order to bring the desiccant dehumidifier up to its necessary operating temperature before the dehumidifier and the "sublimination" process can begin. Specifically, the internal motors, the gear motors, the oils and greases need to be brought up to their proper temperatures before everything can work properly.

Additionally, and as will be understood by those skilled in the art, the desiccant dehumidification with the low vapor pressure air should take place at temperatures in the containment area below, and preferably just below, the freezing point of water. This is incorporated in the process of the invention so as not to melt the ice and thereby free its impurities, or require the ridding of the water which would otherwise result and gather. Various thermostats, humidistats and monitors are therefore employed with the invention to keep the temperature of the drying air in the contained environment preferably at 25° F.-28° F. above zero and of less than 15% relative humidity.

In accordance with a second system arrangement of the invention, the process is the same, except that the insulated container enclosing the desiccant dehumidifier is not brought into the environmentally contained area but is positioned outside the tent. Various hatches can be provided in the insulated container and in the tent to then enable the desiccant dehumidifier in the container to operate with the ice-clad machinery and equipment in the enclosing tent surround.

In both system arrangements of the present invention, furthermore, the insulated containers are provided with wheels so they can be towed by a bulldozer to where the recovery is needed—or loaded on a trailer or truck bed. Also, as the dried air from the dehumidification process is reheated for its heat exchanger to raise the ambient temperature to this positive 25° F.-28° F. range, HEPA filtration is employed to remove any particulate crystals that may be present in the dried air. This further serves to remove any other contaminants which might be potentially explosive or otherwise harmful.

FIG. 1 illustrates the desiccant reactivation apparatus or dehumidifier of my U.S. Pat. No. 6,652,628 and its method of operation through the use of an enclosure 10 having a heat exchanger 12 and a desiccant 14. Reference numeral 20 identifies a building to be dehumidified. Reference numeral 18 indicates a diesel fuel burner, having an exhaust gas stack 22. As will be understood, the diesel fuel burner 18 heats the exchanger 12 from the inside out.

As described in such patent, a first, or reactivation, blower 24 draws ambient air from the surrounds via an 18-inch ductwork 70, for example, into the enclosure 10, over and about the diesel fired heat exchanger 12 and through the desiccant 14 in a first direction, as illustrated by the arrows 50. The moisture liberated, heated air through the desiccant 14 is discharged outside the enclosure 10 as shown by the arrows 51-52. A second, or processed air, blower 26 draws the moisturized air from within the building through like ductwork 72 and the desiccant 14 in a second direction (shown by the arrows 60), which traps the moisture before discharging the dried air out the enclosure 10 as shown by the arrows 61-62. The diesel fired heat exchanger 12 thus dehumidifies the desiccant 14 of the moisture collected from the wet building air in reactivating the desiccant 14 for continuing use.

In this construction of that invention, the ambient air from outside the enclosure 10 is shown as being drawn through the desiccant 14 in a direction opposite to that in which the moisturized air is pulled from the building through the desiccant 14. In such manner of use, a desiccant 14 including a silica gel composition was particularly attractive in collecting the moisture from the water damaged building's air.

Figure 2:
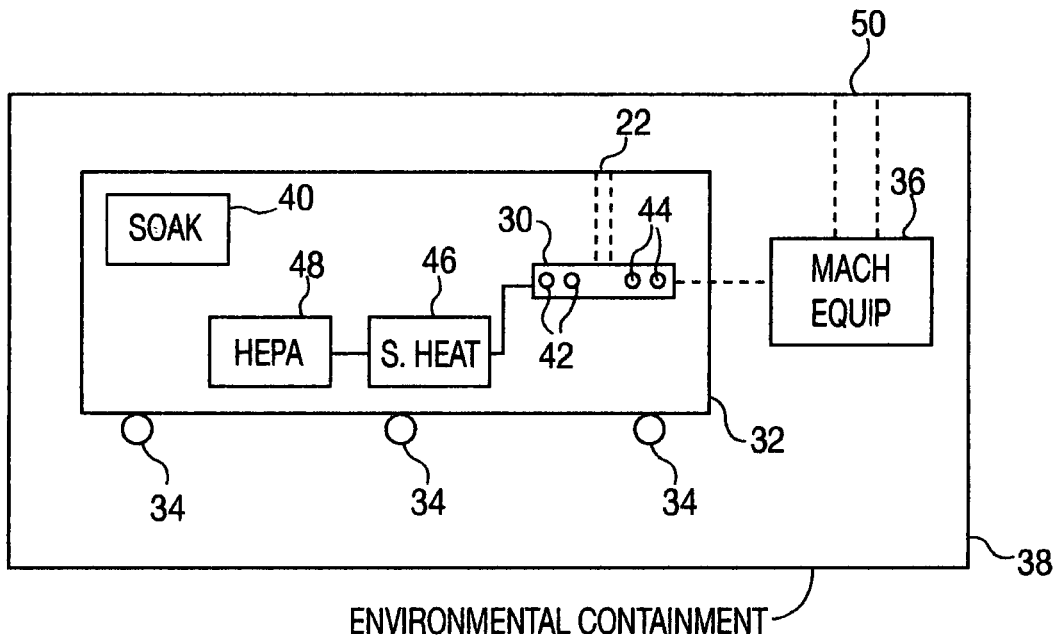
Figure 3:
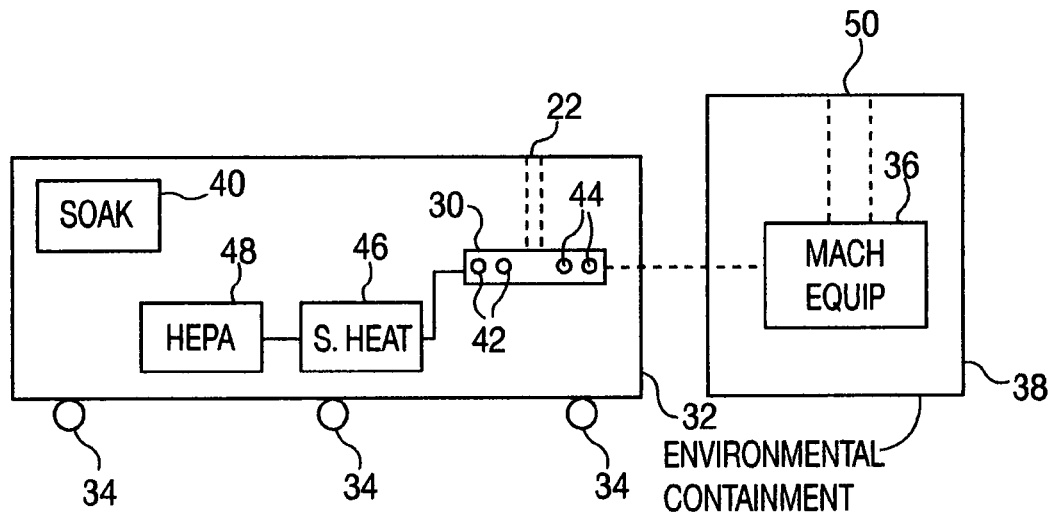

FIG. 2 shows the desiccant dehumidifier 30 of FIG. 1 in block diagram form within an insulated container 32, on appropriate wheels 34 so as to be transportable in bringing the desiccant dehumidifier 30 to the ice-clad machinery and equipment to be recovered. Such machinery and equipment is shown by the reference numeral 36, which is first enclosed within an environmentally contained area—such as by a shrink-wrapped tent 38. In the system arrangement illustrated in FIG. 2, the desiccant dehumidifier 30 within its insulated container 32 is also enclosed within the environmental confinement 38, while in the system arrangement of FIG. 3 the desiccant dehumidifier 30 and its container 32 are located outside the containment area and connected to it so that the processed air blower 26 of FIG. 1 continues to draw the air out from the containment. In both system arrangements of FIGS. 2 and 3, a soaking heater 40 is included to warm the desiccant dehumidifier 30 to its proper temperature for correct use in the frigid environments encountered.

As will be appreciated by those skilled in the art, the sublimation transition from the solid, or ice-clad, phase to the gaseous phase necessitates the temperature in the environmentally contained area to be below the melting point of the ice—less than 32° F. As will additionally be understood, while the transition could still continue at temperatures down to that of the ambient surround—15° F.-25° F. below zero, for example—an optimum range according to the invention is for the desiccant dehumidifier 30 to introduce dehumidified air into the environmentally contained area to maintain the area at temperatures between 25° F. and 28° F. By maintaining the contained area temperature above the ambient surround temperature, the sublimation process takes less time to complete. By maintaining the contained area temperature below 32° F., a leeway is provided against the ice beginning to melt to defeat the sublimation process. To control the range to 25° F.-28° F., one or more thermostats 42 are maintained inside the containment area—and one or more humidistats 44 are maintained there as well so as to control the relative humidity inside the containment area, preferably to an amount less than 15% relative humidity. These thermostats and humidistats tie back to control the desiccant dehumidification in allowing the sublimation process to proceed effectively.

As the desiccant dehumidifier 30 constructed in accordance with my aforementioned patent is effective in introducing dehumidified air only some 30° F. above the ambient outside temperatures that is encountered, a supplemental heater 46 is included in the insulated container 32 of the present invention to heat the ambient minus 15° F.-25° F. or so air drawn from the surrounds by the first, or reactivation, blower 24 of the desiccant dehumidifier over and about its diesel fired heat exchanger 12. This use of supplemental heating raises the temperature of the dehumidified air introduced into the containment area, and hastens the transition to the gaseous state. And, because the gaseous convert of the sublimation process may itself contain potentially explosive or harmful contaminants, a HEPA filter 48 is employed along with the supplemental heater 46 in filtering out any of these contaminants which the reactivation blower 24 might draw into the diesel fired heat exchanger 12.

In operation, then, the desiccant dehumidifier lowers the vapor pressure, and the supplemental filtration is employed because the process is carried on in a highly volatile area. The process effectively converts the ice into a vapor state, which can then be exhausted outside of the environmentally contained area (as to 50) so that the ice within the enclosure effectively disappears. By controlling the containment temperature to the preferred 25°-28° F. range, preferably with less than 15% relative humidity, the desiccant dehumidifier dehumidifies the air, lowering the vapor pressure automatically.

The system and associated method of the invention in recovering the ice-clad machinery and equipment thus operates by first enclosing the machinery and equipment in an environmentally contained area, and then introducing dehumidified air into the area where the temperature is controlled in a substantially 25° F.-28° F. range. The relative humidity in the contained area is controlled at less than 15%, and the desiccant dehumidifier is brought to the containment area in its own insulated container. That temperature in the insulated container is first maintained to bring the desiccant dehumidifier up to its proper operating condition, and the ambient air drawn in the dehumidifier operation is both heated and filtered. Electrically grounding all equipment, piping and control panels is important because of the environment in which the sublimation process takes place.

Whereas there have been described what are considered to be preferred embodiments of the present invention, it will be readily appreciated by those skilled in the art that modifications can be made without departing from the scope of the teachings herein. For example, while the recovery system and associated method of the invention have been described in the context of using the desiccant dehumidifier of my U.S. Pat. No. 6,652,680 design, other desiccant dehumidifiers could be utilized instead, as long as they can be properly fueled in the arctic regions where the present invention is to operate. And, while other temperature ranges for the environmentally contained area can be employed, utilizing lower temperatures just lengthens the time for the "sublimation" to be completed, while using higher temperatures could cause the ice-cladding to thaw and melt in impairing the gaseous conversion. Also, while no more than a 15% relative humidity is preferred to be maintained in the environmentally contained area of the ice-clad machinery and equipment, the sublimation process could still proceed at a greater relative humidity—again, however, requiring a further time period for completion. For these and other such reasons, resort should be had to the claims appended hereto for a true understanding of the scope of the invention of using a desiccant dehumidifier to lower the vapor pressure in the environmentally contained area in optimizing the ice-clad recovery.

I claim:

1. A system for recovering and reclaiming frozen ice-clad machinery and equipment comprising: an environmental containment surrounding and enclosing the frozen machinery and equipment; a transportable, mobile desiccant dehumidifier introducing dehumidified air into the environmental containment; and means for controlling the desiccant dehumidifier to maintain the temperature within the environmental containment at a level below the temperature at which ice melts;

whereby controlling the desiccant dehumidifier to maintain the temperature within the environmental containment below the temperature at which ice melts converts the frozen ice-cladding of the machinery and equipment to a gas phase with substantially no intermediate liquid state; wherein the transportable, mobile desiccant dehumidifier is within, or connected to, the environmental containment.

2. The system of claim 1 wherein said means controls the desiccant dehumidifier to maintain the temperature within the environmental containment to a range of between 25° F. and 28° F.

3. The system of claim 2, also including means for controlling the desiccant dehumidifier to maintain the relative humidity within the environmental containment to a level not in excess of 15 percent.

4. The system of claim 2 wherein the transportable, mobile desiccant dehumidifier is enclosed within an insulated container.

5. The system of claim 4 wherein the insulated container is included within an area encompassed by the environmental containment.

6. The system of claim 4 wherein the insulated container is external to an area encompassed by the environmental containment.

7. The system of claim 4 wherein the transportable, mobile desiccant dehumidifier includes an enclosure housing a heat exchanger, a desiccant, a first blower drawing ambient air from outside the enclosure over the heat exchanger through the desiccant in a first direction, a second blower drawing air from the environmental containment through the desiccant in a second direction, and means for firing the heat exchanger with diesel fuel.

8. The system of claim 7 wherein the insulated container rests on a trailer or truck bed adjacent to the environmental containment surrounding the machinery and equipment.

9. The system of claim 8 wherein the desiccant includes a silica gel composition.

10. The system of claim 1, also including means for controlling the desiccant dehumidifier to maintain the relative humidity within the environmental containment to a level not in excess of 15 percent.

11. The system of claim 1 wherein said environmental containment enclosing the frozen ice-clad, machinery and equipment comprises a shrink wrapped tent.

12. The system of claim 11 wherein said means controls the desiccant dehumidifier to maintain the temperature within the environmental containment to a range of between 25° F. and 28° F., and also including means for controlling the desiccant dehumidifier to maintain the relative humidity within the environmental containment to a level not in excess of 15 percent.

13. A method for recovering and reclaiming frozen ice-clad machinery and equipment comprising the steps of: providing an environmental containment surround enclosing said frozen machinery and equipment; providing a transportable, mobile desiccant dehumidifier introducing dehumidified air into said surround; and controlling the desiccant dehumidifier to maintain the temperature within said surround at a level below the temperature at which ice melts; whereby controlling the desiccant dehumidifier to maintain the temperature within the environmental containment below the temperature at which ice melts converts the frozen ice-cladding of the machinery and equipment to a gas phase with substantially no intermediate liquid state; wherein the transportable, mobile desiccant dehumidifier is within, or connected to, the environmental containment.

14. The method of claim 13 wherein the temperature within said surround is maintained to a range of between 25° F. and 28° F.

15. The method of claim 14, also including the step of filtering the desiccant dehumidified air to be introduced into the containment surround.

16. The method of claim 15, including the step of increasing the temperature of the introduced dehumidified air above the ambient temperature external to said environmental containment surround.

* * * * *